United States Patent [19]

Huang

[11] Patent Number: 4,785,670
[45] Date of Patent: Nov. 22, 1988

[54] COMPACT PRESSURE GAUGE

[76] Inventor: Ten T. Huang, No. 4, Lane 30, Wu-Chang St., Pan-Chiao City, Taiwan

[21] Appl. No.: 162,578

[22] Filed: Mar. 1, 1988

[51] Int. Cl.⁴ .............................................. G01L 7/16
[52] U.S. Cl. ........................................ 73/744; 116/266
[58] Field of Search .................. 73/744, 146.8, 146.2, 73/146.3, 745, 746; 116/34 R, 266

[56] References Cited
U.S. PATENT DOCUMENTS 4,742,714 5/1988 Huang .................................. 73/744

Primary Examiner—Donald O. Woodiel
Attorney, Agent, or Firm—Bacon & Thomas

[57] ABSTRACT

A compact pressure gauge includes a cylinder which has a compressed gas inlet, a piston, a U-shaped piston rod, and a compression spring. The compression spring is sleeved on the piston rod in the cylinder for biasing the piston against the compressed gas pressure exerted on the piston. The U-shaped piston rod has parallel first and second arms. The first arm extends into the cylinder. The second arm includes a rack secured thereto. A rotating shaft includes an indicator secured thereto for displaying the rotational degree of the rotating shaft, and a pinion secured to the rotating shaft for meshing with the rack. A channel member is secured to the cylinder and has a guide slot through which the second arm extends. A positioning plate is secured to the channel member so that the rotating shaft is journalled on the cylinder and the positioning plate. When the piston rod is moved, the rotating shaft is rotated due to the fact that the pinion always meshs with the rack.

5 Claims, 4 Drawing Sheets

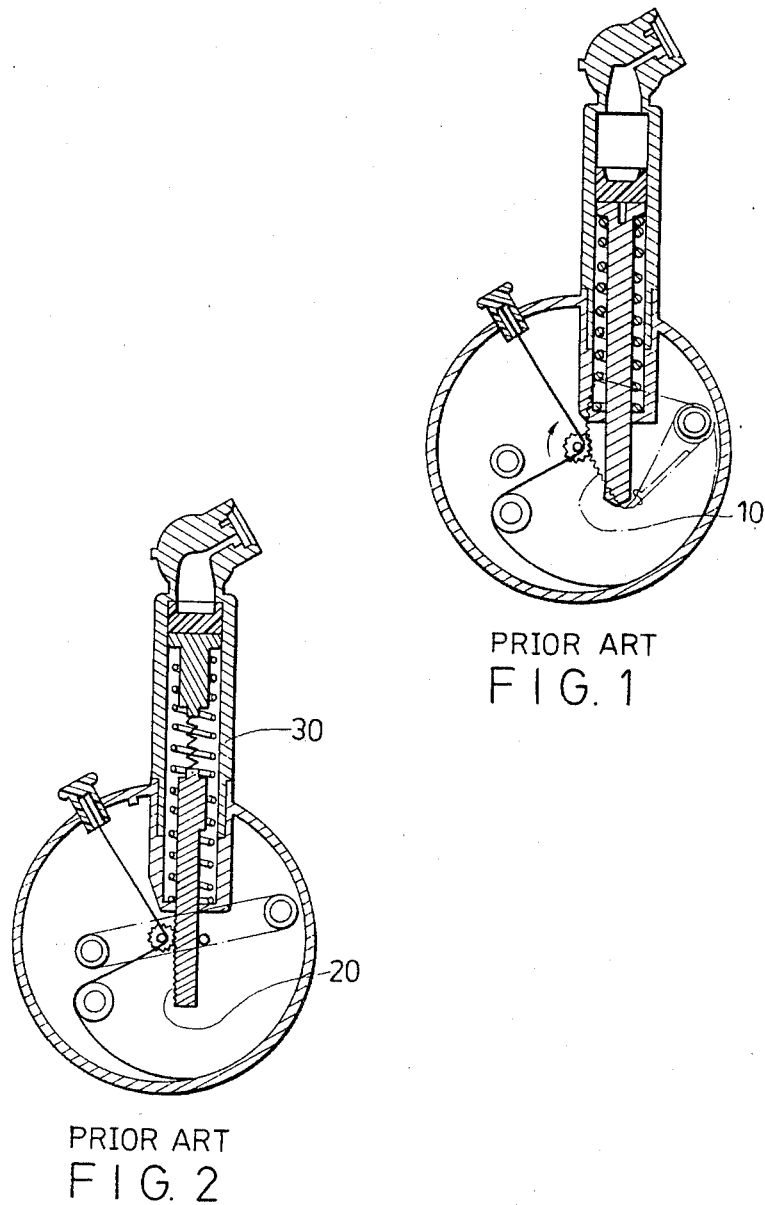
PRIOR ART
FIG. 1
PRIOR ART
FIG. 2

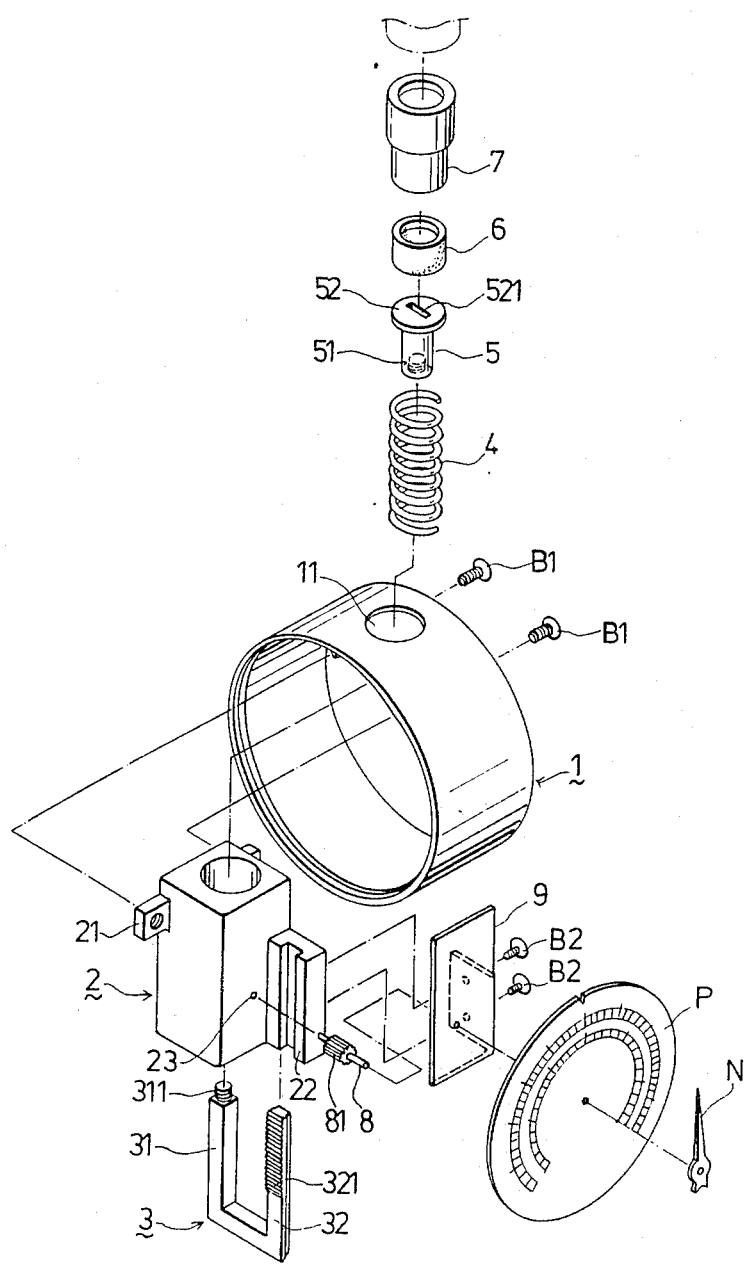
FIG.3

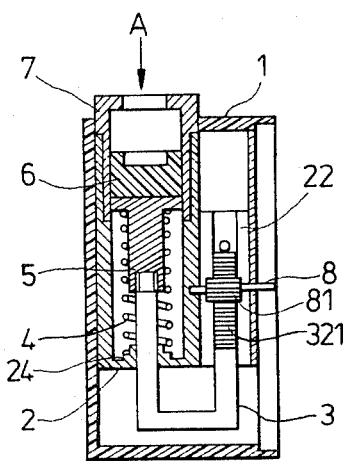
F I G. 4
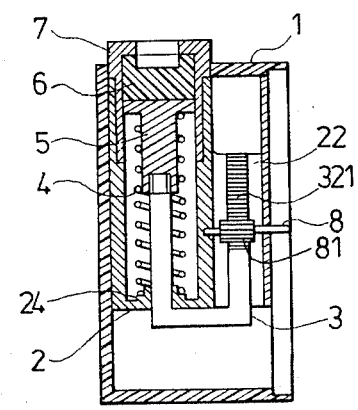
F I G. 5

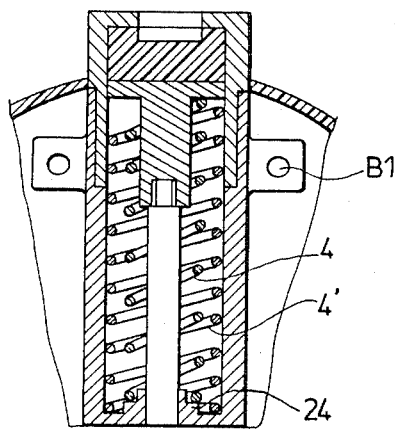
FIG. 6
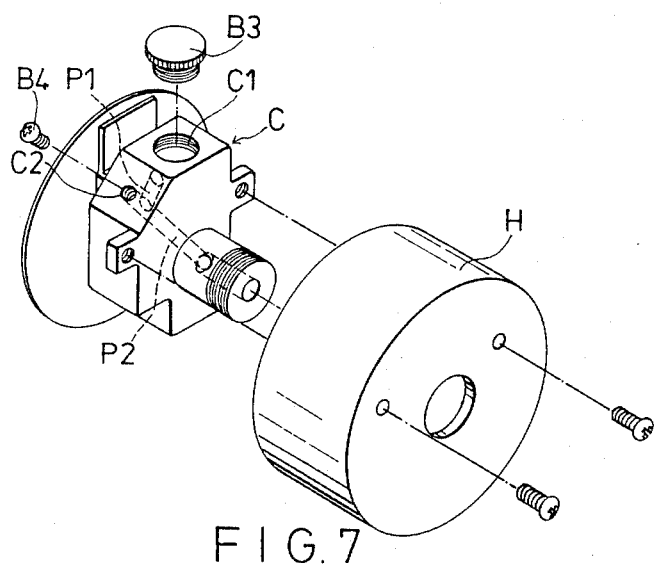
FIG. 7

COMPACT PRESSURE GAUGE

BACKGROUND OF THE INVENTION

This invention relates to a pressure gauge, and more particularly to a compact pressure gauge.

A conventional pressure gauge generally has a structure similar to that shown in FIG. 1, which has a rotatable sector-like member 10. As illustrated, the sector-like member 10 has a curved edge which is toothed. Accuracy of the pressure gauge depends on the precision of the small teeth of the sector-like member 10, creating difficulties in manufacturing the sectorlike member 10. Furthermore, once dust deposits on the small teeth, undesired errors will be caused in measurement. Therefore, I disclosed an improved pressure gauge (see FIG. 2) in U.S. patent application Ser. No. 938,886, which has just been granted a patent. In this improvded pressure gauge, the sector-like member 10 is replaced with a movable rack member 20. The rack member 20 has an end portion movable in a cylinder 30, and the opposite end portion thereof is provided with a rack. Although it is easier to make the rack member 20 than the sector-like member 10, the rack member 20 occupies more space due to its movement.

SUMMARY OF THE INVENTION

It is therefore the main object of this invention to provide a compact pressure gauge with a short rack member.

According to this invention, a compact gauge includes a generally U-shaped rack member which has generally parallel first and second arms. The first arm extends into a cylinder and thus acts as a piston rod. The second arms has a rack.

BRIEF DESCRIPTION OF THE DRAWINGS

Other features and advantages of this invention will become apparent in the following detailed description of the preferred embodiments of this invention with reference to the accompanying drawings in which:

FIG. 1 is a sectional view of a conventional pressure gauge;

FIG. 2 is a sectional view of another conventional pressure gauge;

FIG. 3 is an exploded view of a compact pressure gauge in accordance with a first embodiment of this invention;

FIGS. 4 and 5 are schematic views illustrating the operation of the compact pressure gauge in accordance with the first embodiment of this invention;

FIG. 6 is a sectional view showing the cylinder of the compact pressure gauge in accordance with a second embodiment of this invention; and FIG. 7 is an exploded view of a compact pressure gauge in accordance with a third embodiment of this invention.

DETAILED DESCRIPTION OF THE PREFERRED EMBODIMENTS

Referring to FIGS. 3-6, a compact pressusre gauge of this invention is shown. The compact pressure gauge includes an outer housing 1 which looks like a circular barrel. The outer housing 1 is formed in its upper surface with a circular hole 11. A cylinder body 2 is provided with two lugs 21, each of which has a threaded hole opposite a circular hole (not shown) in the outer housing 1, so that the cylinder body 2 is screwed to the outer housing 1 by two first lock bolts B1. In addition, the cylinder body 1 has a cylindrical bore in its upper end surface and a square lower end opening formed in its bottom wall.

A channel member 22 of a U-shaped cross-section is integrally formed with the cylinder body 1 at a side wall therefore and has an open-ended guide slot. A U-shaped piston rod 3 has a first arm 31 of a square cross-section with an externally threaded upper end 311, and a second arm 32 of a rectangular cross-section including a rack 321 formed thereon. The first arm 31 extends into the bore in the cylinder body 1 through the square lower end opening of the cylinder body 2 so that a first compression spring 4 is sleeved on the first arm 31 in the cylinder body 1. The second arm 32 is received slidable in the guide slot in the channel member 22. An abutment element 5 has an internally threaded lower end 51 engaged threadably with the upper end of the first arm 31 of the piston rod 3, and an outward flange 52 formed in its upper end surface with a screwdriver hole 521. With the screwdriver hole 521 provided in the upper end surface of the abutment element 5, the abutment element 5 can be screwed to the first arm 31 of the piston rod 3. After a seal 6 is placed into a cylinder cover 7, the lower end of the cylinder cover 7 is inserted tightly into the upper end of the cylinder body 1 so that the cylinder body 1 and the cylinder cover 7 form together a cylinder, as shown in FIGS. 4 and 5. Consequently, the abutment element 5 is biased by the first sping 4 to abut against the seal 6 so that the seal 6 acts as a piston.

A pivot hole 23 is formed in a side wall of the cylinder body 1 so that a rotating shaft 8 is mounted rotatably on the cylinder body 1 at an end thereof. The opposite end of the rotating shaft 8 is inserted through a circular hole in a L-shaped positioning plate 9. The positioning plate 9 has two circular holes therein opposite two threaded holes (not shown) in the back of the channel member 22 so that the positioning plate 9 is screwed to the channel member 22 by two second lock bolts B2. After the rotating shaft 8 has been inserted through the positioning plate 9, it is also inserted through the central hole in a circular indicating plate P while permitting an indicating needle N to be secured thereto.

A piston 81 is secured to the rotating shaft 8 for meshing with the rack 321 of the piston rod 3. When the compact pressure gauge is idle, the seal 6 is pressed by the first spring 4 to abut against the upper wall of the cylinder cover 7, as shown in FIG. 5. When the compact pressure gauge is in use, compressed gas enters the cylinder cover 7 in a direction indicated by an arrow A to impel the seal 6, abutment element 5, and piston rod 3 downwardly. Because the pinion 81 always meshes with the rack 321, the downward movement of the piston rod 3 permits the rotating shaft 8 and the indicating needle N to be rotated.

As explained in the foregoing, the pressure gauge of this invention has a relatively small volume and a simple structure.

The bottom wall of the cylinder body 2 is provided on its inner surface with a stepped cylindrical spring seat 24. If necessary, referring to FIG. 6, an additional compression spring 4' may be located on the spring seat 24 around the first spring 4 to increase the spring pressure against the abutment element 5 and the seal 6.

Alternatively, referring to FIG. 7, the compressed gas inlet of the compact pressure gauge may be provided in the back of the outer housing, for convenience in reading. In this embodiment, the compact pressure gauge includes a cylinder body C with a cylindrical internal space (not shown) for receiving a piston, a piston rod, and at least one spring therein in the aforesaid manner. For clarity, the piston, piston rod, and spring are not shown in FIG. 7. The cylinder body C has a large threaded hole C1 formed in its upper surface and engaged sealingly with a large bolt B3, and a small threaded hole C2 formed in its inclined side surface and engaged sealingly with a small bolt B4. The inner end portion of the large threaded hole C1 is communicated with the inner end portion of the small threaded hole C2 through a straight gas passage P1. The inner end portion of the small threaded hole C2 is communicated with the exterior of the outer housing H through a V-shaped gas passage P2. Certainly, O rings (not shown) may be sleeved on the large and small bolts B3 and B4 to ensure an air-tight seal between the cylinder body C and the bolts B3 and B4.

With this invention thus explained, it is apparent that numerous modifications and variations can be made without departing from the scope and spirit of this invention. It is therefore intended that this invention be limited only as indicated in the appended claims.

I claim:
1. A pressure gauge including:
   an outer housing:
   a rotating shaft journalled in said outer housing and including a pinion fixed on said rotating shaft, and an indicator secured to said rotating sahft for displaying rotational degree of said rotating shaft;
   a cylinder, fixed on said outer housing, adapted to be communicated with an interior of a hollow article to be measured, having a piston and a U-shaped piston rod which has generally parallel first and second arms, said first arm extending into said cylinder, said second arm being positioned outside said cylinder and including a rack secured to said second arm for meshing with said pinion of said rotating shaft;
   a channel member, secured to said cylinder, having an open-ended guide slot therein for sliding movement of said second arm of said piston rod in said guide slot; and
   a spring unit connected to said piston in said cylinder for biasing said piston against compressed gas pressure exerted on said piston.

2. A pressure gauge as claimed in claim 1, wherein said spring unit includes a compression spring sleeved on said piston rod within said cylinder.

3. A pressure gauge as claimed in claim 1, wherein said spring unit includes a plurality of compression springs of different sizes sleeved on said piston rod and arranged one in another, and wherein said cylinder has an inner end wall on which a stepped cylindrical spring seat is provided for locating said compression springs in said cylinder.

4. A pressure gauge as claimed in claim 1, wherein said cylinder is formed in a side wall thereof with a pivot hole in which an end of said rotating shaft is inserted rotatably.

5. A pressure gauge as claimed in claim 4, further comprising a positioning plate secured to said channel member, said positioning plate being formed therein with a circular hole through which the other end of said rotating shaft is inserted rotatably.

* * * * *